US008902845B2

(12) United States Patent
Kakishima et al.

(10) Patent No.: US 8,902,845 B2
(45) Date of Patent: Dec. 2, 2014

(54) COMMUNICATION CONTROL METHOD, BASE STATION APPARATUS AND MOBILE STATION APPARATUS

(75) Inventors: Yuichi Kakishima, Tokyo (JP); Hidekazu Taoka, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/816,733

(22) PCT Filed: Aug. 10, 2011

(86) PCT No.: PCT/JP2011/068274
§ 371 (c)(1),
(2), (4) Date: Mar. 18, 2013

(87) PCT Pub. No.: WO2012/023472
PCT Pub. Date: Feb. 23, 2012

(65) Prior Publication Data
US 2013/0182671 A1     Jul. 18, 2013

(30) Foreign Application Priority Data

Aug. 16, 2010    (JP) .................................. 2010-181908

(51) Int. Cl.
| | |
|---|---|
| *H04W 4/00* | (2009.01) |
| *H04W 72/04* | (2009.01) |
| *H04B 7/06* | (2006.01) |
| *H04B 7/04* | (2006.01) |
| *H04W 16/28* | (2009.01) |

(52) U.S. Cl.
CPC ........... *H04W 72/042* (2013.01); *H04B 7/0639* (2013.01); *H04B 7/0417* (2013.01); *H04W 16/28* (2013.01); *H04B 7/063* (2013.01); *H04B 7/0404* (2013.01)
USPC .......................................................... 370/329

(58) Field of Classification Search
CPC .. H04B 7/0417; H04B 7/0452; H04B 7/0456; H04B 7/0639; H04B 7/0404; H04W 72/042; H04W 16/28; H04W 72/04
USPC .................. 370/328, 329, 400; 375/260, 267; 455/452.1
See application file for complete search history.

(56) References Cited

U.S. PATENT DOCUMENTS

| | | | | |
|---|---|---|---|---|
| 2009/0262695 | A1* | 10/2009 | Chen et al. ..................... | 370/329 |
| 2011/0064159 | A1* | 3/2011 | Ko et al. ........................ | 375/267 |
| 2011/0105137 | A1* | 5/2011 | Gaal et al. .................. | 455/452.1 |
| 2011/0243079 | A1* | 10/2011 | Chen et al. ..................... | 370/329 |
| 2011/0317643 | A1* | 12/2011 | Gaal et al. ..................... | 370/329 |

OTHER PUBLICATIONS

International Search Report issued in PCT/JP2011/068274 mailed Nov. 1, 2011 (3 pages).

(Continued)

*Primary Examiner* — Edan Orgad
*Assistant Examiner* — Ivan O Latorre
(74) *Attorney, Agent, or Firm* — Osha Liang LLP

(57) ABSTRACT

To notify the control information necessary for uplink MIMO transmission while reducing overhead, generated is a UL grant having the PMI/RI field and non-transmission/swap flag field of 1 bit indicative of a transport block made non-transmission and the presence or absence of a swap of control information between two transport blocks corresponding to a value of the PMI/RI field, a downlink control channel signal including the UL grant is transmitted to a mobile station apparatus, and the transport block made non-transmission and the presence or absence of a swap of control information between two transport blocks is determined from the non-transmission/swap flag of the UL grant.

10 Claims, 8 Drawing Sheets

(56) References Cited

OTHER PUBLICATIONS

3GPP TR 25.913 V8.0.0; "3rd Generation Partnership Project; Technical Specification Group Radio Access Nework; Requirements for Evolved UTRA (E-UTRA) and Evolved UTRAN (E-UTRAN) (Release 8)"; Dec. 2008 (18 pages).

* cited by examiner

COMMUNICATION CONTROL METHOD, BASE STATION APPARATUS AND MOBILE STATION APPARATUS

TECHNICAL FIELD

The present invention relates to a communication control method, base station apparatus and mobile station apparatus, and more particularly, to a communication control method, base station apparatus and mobile station apparatus that support multi-antenna transmission.

BACKGROUND ART

In UMTS (Universal Mobile Telecommunications System) networks, for the purpose of improving spectral efficiency and further improving data rates, by adopting HSDPA (High Speed Downlink Packet Access) and HSUPA (High Speed Uplink Packet Access), it is performed exploiting maximum features of the system based on W-CDMA (Wideband Code Division Multiple Access). For the UMTS network, for the purpose of further increasing high-speed data rates, providing low delay and the like, Long Term Evolution (LTE) has been studied.

In the 3G system, a fixed band of 5 MHz is substantially used, and it is possible to achieve transmission rates of approximately maximum 2 Mbps in downlink. Meanwhile, in the LTE-scheme system, using variable bands ranging from 1.4 MHz to 20 MHz, it is possible to achieve transmission rates of maximum 300 Mbps in downlink and about 75 Mbps in uplink. Further, in the UMTS network, for the purpose of further increasing the wide-band and high speed, successor systems to LTE have been studied (for example, LTE Advanced (LTE-A)). For example, in LTE-A, it is scheduled to increase 20 MHz that is the maximum system band in LTE specifications to about 100 MHz. Further, it is scheduled to increase four antennas that are the maximum number of transmission antennas in LTE specification to eight antennas.

Moreover, in the LTE-scheme system (LTE system), MIMO (Multi Input Multi Output) systems are proposed as radio communication techniques for transmitting and receiving data using a plurality of antennas and improving a data rate (spectral efficiency) (for example, see Non-patent Document 1). In the LTE system, two modes, spatial multiplexing transmission mode (SU-MIMO (Single User MIMO)) and transmission diversity transmission mode, are defined as downlink MIMO transmission modes. The spatial multiplexing transmission mode is to spatially multiplex signals of a plurality of streams in the same frequency and time to transmit, and is effective at increasing a peak data rate. The transmission diversity transmission mode is to transmit signals of the same stream subjected to space-frequency (time) coding from a plurality of antennas, and is effective at improving reception quality of a cell-edge user due to the transmission antenna diversity effect.

In such a MIMO system, proposed are techniques (rank adaptation) for optimally controlling the number of layers of spatial multiplexing corresponding to reception conditions in each mobile station receiver. In the rank adaptation, based on downlink channel information (reception SIRN, inter-antenna fading correlation), a base station transmitter performs control for transmitting information to a mobile station receiver good in the channel state by the spatial multiplexing transmission mode, while transmitting information to a mobile station receiver poor in the channel state by the transmission diversity transmission mode.

CITATION LIST

Non-patent Document

[Non-patent Document 1] 3GPP TR 25.913 "Requirements for Evolved UTRA and Evolved UTRAN"

SUMMARY OF THE INVENTION

Technical Problem

In the LTE system, the above-mentioned MIMO transmission is applied only to downlink, and is not applied to uplink. Meanwhile, in the LTE-Ascheme system (LTE-Asystem), it is scheduled to introduce MIMO transmission not only to downlink but also to uplink. In the LTE-A system, also in uplink MIMO transmission modes, defined are two modes, spatial multiplexing transmission mode (SU-MIMO (Single User MIMO)) and transmission diversity transmission mode. In SU-MIMO transmission in uplink, it is scheduled to introduce SU-MIMO transmission of two or four transmission antennas and rank adaptation for performing multi-codeword transmission of maximum two codewords.

In order to effectively increase data rates in such uplink MIMO transmission, it is necessary to suitably notify mobile station apparatuses of control information to support radio communication techniques such as the above-mentioned multi-codeword transmission and rank adaptation. Further, in notifying such control information, it is also demanded to reduce overhead in relation to transmission data.

The present invention was made in view of such circumferences, and it is an object of the invention to provide a communication control method, base station apparatus and mobile station apparatus for enabling the control information necessary for uplink MIMO transmission to be notified, while reducing overhead.

Solution to Problem

A communication control method of the invention is characterized by having the steps of generating a UL grant having a field for PMI/RI information, and another field for a non-transmission/swap flag of 1 bit indicative of a transport block made non-transmission and the presence or absence of a swap of control information between two transport blocks, corresponding to a value of the field for PMI/RI information, transmitting a downlink control channel signal including the UL grant to a mobile station apparatus, and determining the transport block made non-transmission and the presence or absence of a swap of control information between two transport blocks from the non-transmission/swap flag of the UL grant.

According to this method, 1 bit is used to notify a transport block made non-transmission and the presence or absence of a swap of control information between two transport blocks, corresponding to a value of the field for PMI/RI information. Therefore, it is possible to notify the control information needed in actualizing processing for making one of transport blocks non-transmission by rank adaptation, and processing for swapping control information to uniform data rates between transport blocks in uplink MIMO transmission, while reducing overhead.

A base station apparatus of the invention is characterized by having generation section configured to generate a UL grant having a field for PMI/RI information, and another field for a non-transmission/swap flag of 1 bit indicative of a transport block made non-transmission and the presence or absence of a swap of control information between two transport blocks, corresponding to a value of the field for PMI/RI information, and transmission section configured to transmit a downlink control channel signal including the UL grant to a mobile station apparatus.

According to this configuration, 1 bit is used to notify a transport block made non-transmission and the presence or absence of a swap of control information between two transport blocks, corresponding to a value of the field for PMI/RI information. Therefore, it is possible to notify the control information needed in actualizing processing for making one of transport blocks non-transmission by rank adaptation, and processing for swapping control information to uniform data rates between transport blocks in uplink MIMO transmission, while reducing overhead.

A mobile station apparatus of the invention is characterized by having reception section configured to receive a downlink control channel signal including a UL grant having a field for PMI/RI information, and another field for a non-transmission/swap flag of 1 bit indicative of a transport block made non-transmission and the presence or absence of a swap of control information between two transport blocks, corresponding to a value of the field for PMI/RI information, and decoding section configured to decode the downlink control channel signal and determining the transport block made non-transmission and the presence or absence of a swap of control information between two transport blocks from the non-transmission/swap flag of the UL grant.

According to this configuration, it is possible to determine the transport block made non-transmission and the presence or absence of a swap of control information between two transport blocks from the non-transmission/swap flag of 1 bit of the UL grant corresponding to a value of the field for PMI/RI information. Therefore, it is possible to notify the control information needed in actualizing processing for making one of transport blocks non-transmission by rank adaptation, and processing for swapping control information to uniform data rates between transport blocks in uplink MIMO transmission, while reducing overhead.

Technical Advantage of the Invention

According to the invention, it is possible to notify the control information necessary for uplink MIMO transmission, while reducing overhead.

BEST MODE FOR CARRYING OUT THE INVENTION

Figure 1:
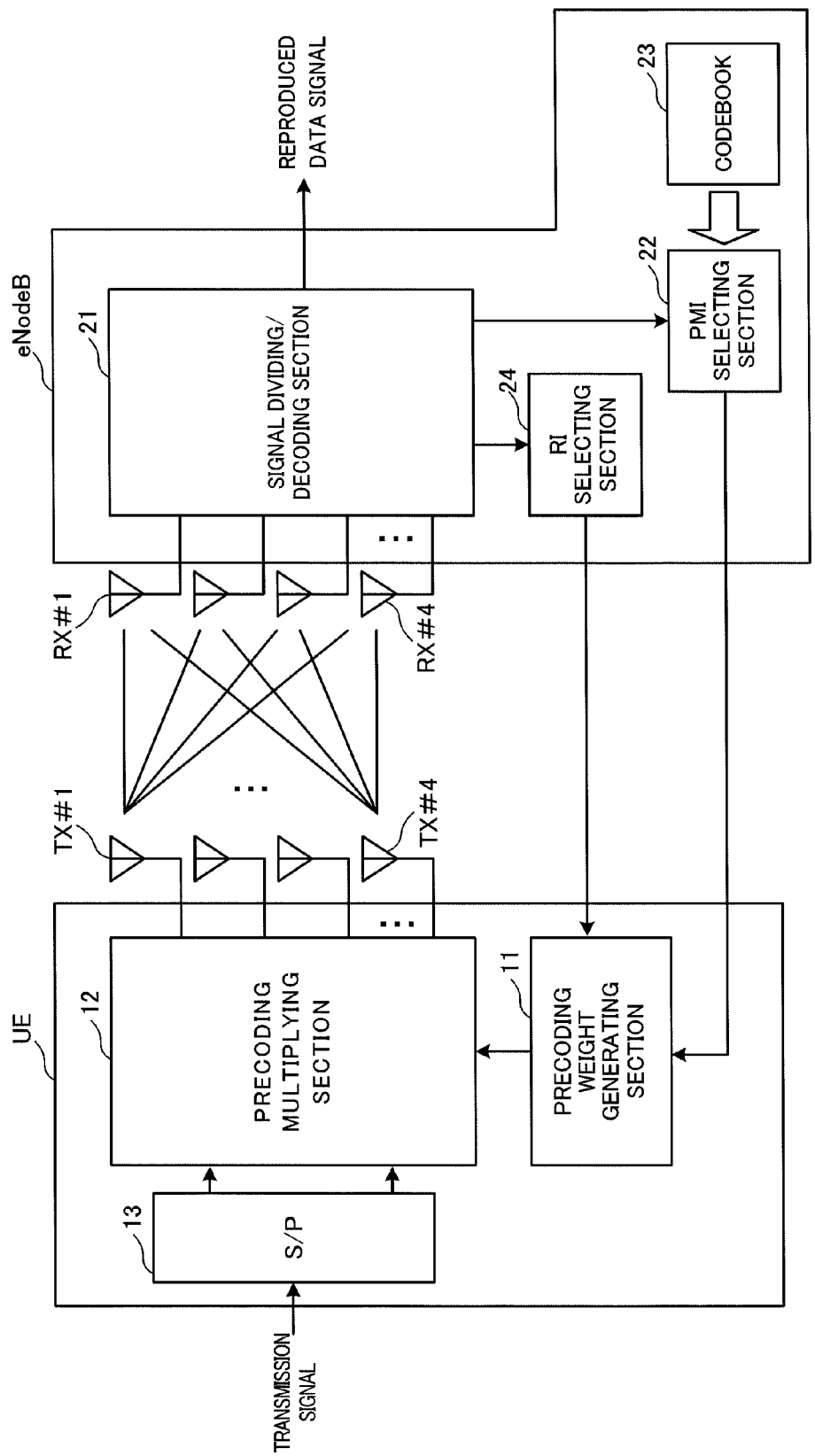
FIG. 1 is a conceptual diagram of a MIMO system to which is applied a communication control method according to the invention.

An Embodiment of the invention will specifically be described below with reference to accompanying drawings. Described first is uplink MIMO transmission scheduled to introduce in LTE-A systems, based on a MIMO system as shown in FIG. 1 as a premise. FIG. 1 is a conceptual diagram of a MIMO system to which is applied a communication control method according to the invention. In addition, in the MIMO system as shown in FIG. 1, shown is the case where each of a base station apparatus eNode B and mobile station apparatus UE is provided with four antennas.

In uplink MIMO transmission in the MIMO system as shown in FIG. 1, the base station apparatus eNode B measures a channel variation amount using a reception signal (more specifically, a reference signal (SRS: Sounding Reference Signal)) included in the reception signal) from each antenna, and based on the measured channel variation amount, selects PMI (Precoding Matrix Indicator) and RI (Rank Indicator) corresponding to a phase/amplitude control amount (precoding weight) that maximizes throughput (or reception SINR) subsequent to combining transmission data from respective transmission antennas of the mobile station apparatus UE. Then, the apparatus eNode B transmits the selected PMI and RI (or PMI including RI information) to the mobile station apparatus UE in downlink as feedback. The mobile station apparatus UE performs precoding on transmission data based on the PMI and RI transmitted from the base station apparatus eNode B as feedback, and then, transmits information from each antenna.

In the base station apparatus eNode B as shown in FIG. 1, a signal dividing/decoding section 21 divides and decodes control channel signals and data channel signals included in reception signals received via reception antennas RX#1 to RX#4. Data channel signals for the base station apparatus eNode B are reproduced by the signal dividing/decoding section 21 performing decoding processing. A PMI selecting section 22 selects a PMI corresponding to channel states estimated in a channel estimation section, not shown. At this point, the PMI selecting section 22 selects an optimal PMI from a codebook 23 that defines N known precoding weights such that a plurality of precoding weights is determined for each rank between the mobile station apparatus UE and the base station apparatus eNode B, and PMIs associated with the precoding matrixes. An RI selecting section 24 selects an RI corresponding to channel states estimated in the channel estimation section. The PMI and RI are transmitted to the mobile station apparatus UE as feedback information.

Meanwhile, in the mobile station apparatus UE as shown in FIG. 1, a precoding weight generating section 11 selects or generates precoding weights based on the PMI and RI transmitted from the base station apparatus eNode B as feedback. Selection or generation of precoding weights is performed based on a codebook (omitted in the figure) that defines precoding weights and PMIs as in the base station apparatus eNode B. A precoding multiplying section 12 multiplies transmission signals subjected to parallel transform in a serial/parallel transform section (S/P) 13 by precoding weights, and thereby controls (shifts) the phase and amplitude for each of transmission antennas TX#1 to TX#4, respectively. By this means, transmission data with the phase and amplitude shifted is transmitted from four transmission antennas, TX#1 to TX#4.

The mobile station apparatus UE is notified of control information to support such uplink MIMO transmission by a UL grant transmitted from the base station apparatus eNode B. The UL grant includes fields to define resource allocation information (RA: Resource Allocation) determined for each mobile station apparatus UE, modulation scheme/channel coding rate (MCS: Modulation and Coding Scheme) information, information for HARQ, an identifier (NDI: New Data Indicator) to distinguish between new data and retransmission data, Redundancy Version (RV) information, a transmission power control command (TPC: Transmission Power Control) of the PUCCH (Physical Uplink Control CHannel), etc.

In uplink MIMO transmission, it is scheduled to support radio communication techniques such as multi-codeword transmission of maximum two codewords and rank adaptation. Therefore, for the UL grant, it is scheduled to prepare MCS/RV fields and NDI fields corresponding to two transport blocks in response to two codewords. Particularly, in the 3GPP (Third Generation Partnership Project), it is agreed to specify 10 bits as MCS/RV fields for two transport blocks, and specify 2 bits as NDI fields for two transport blocks. Further, it is scheduled to prepare a PMI/RI field for precoding control and rank adaptation.

Meanwhile, in rank adaptation in uplink MIMO transmission, when rank 1 is selected, information transmission is performed only in one transport block. Therefore, the UL grant needs to support processing for making a transport block that is not used in information transmission a non-transmission (disabled) state. Further, when both transport blocks are used in MIMO transmission, in the case where an antenna gain difference is large between antennas, in order to uniform data rates between transport blocks, it is preferable to support processing for interchanging two transport blocks and antennas that actually perform transmission, by swapping control information of respective transport blocks. Further, it is also demanded to reduce overhead in relation to the transmission data. The inventor of the present invention focused on the respect that it is necessary to reflect the demands in the UL grant in order to increase data rates in uplink MIMO transmission, and arrived at the invention.

A communication control method according to the invention is characterized by generating a UL grant having a field for PMI/RI information and another field for a non-transmission/swap flag of 1 bit indicative of a transport block made non-transmission and the presence or absence of a swap of control information between two transport blocks, corresponding to a value of the field for PMI/RI information, transmitting a downlink control channel signal including the UL grant to a mobile station apparatus UE, and determining the transport block made non-transmission and the presence or absence of a swap of control information between two transport blocks from the non-transmission/swap flag of the UL grant.

According to the communication control method according to the invention, 1 bit is used to notify a transport block made non-transmission and the presence or absence of a swap of control information between two transport blocks. Therefore, it is possible to notify the control information needed in actualizing the processing for making one of transport blocks non-transmission by rank adaptation, and the processing for swapping control information to uniform data rates between transport blocks in uplink MIMO transmission, while reducing overhead.

Figure 2:
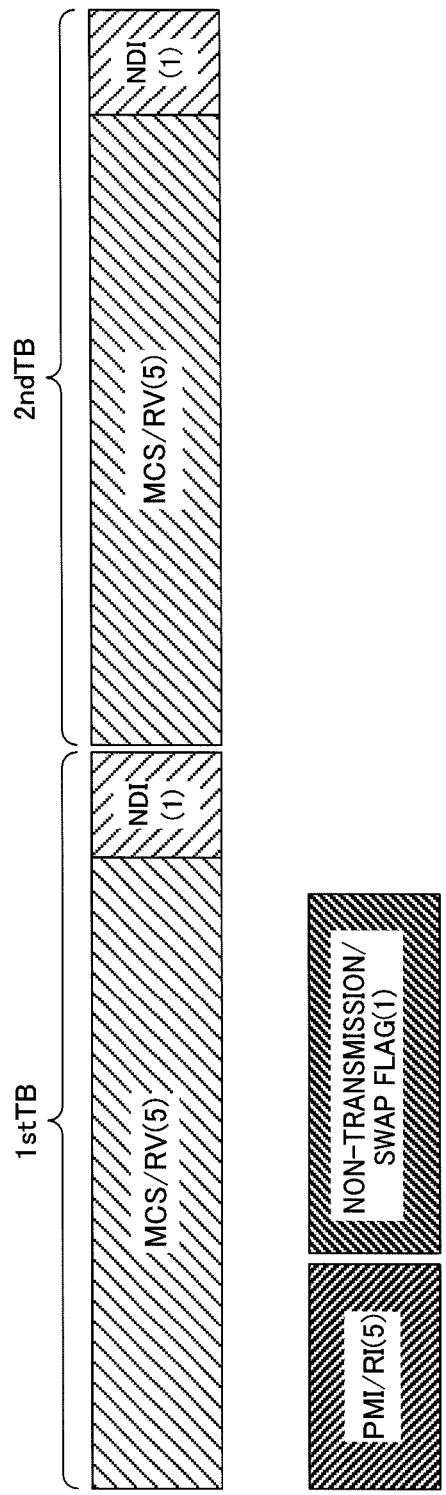
FIG. 2 is an explanatory view of a UL grant configuration used in the communication control method according to the invention.

Described below is a configuration of a UL grant used in the communication control method according to the invention. FIG. 2 is an explanatory view of the configuration of the UL grant used in the communication control method according to the invention. In addition, for convenience in description, FIG. 2 shows only a part of fields (MCS/RV fields, NDI fields, PMI/RI field and flag field) of the UL grant related to the communication control method according to the invention. Further, FIG. 2 shows the configuration of the UL grant when MIMO transmission is performed using four transmission antennas.

As shown in FIG. 2, the UL grant used in the communication control method according to the invention includes MCS/RV fields each of 5 bits (total 10 bits) and NDI fields each of 1 bit (total 2 bits) for first and second transport blocks. Further, the UL grant includes the PMI/RI field of 5 bits for designating PMI and RI used in precoding control and rank adaptation of uplink MIMO transmission. Furthermore, the UL grant includes the flag field of 1 bit for designating a flag (hereinafter, referred to as a "non-transmission/swap flag") indicative of a transport block made non-transmission and the presence or absence of a swamp of control information between two transport blocks.

Herein, the non-transmission/swap flag acts as a flag to designate a transport block (i.e. transport block made a disabled state) that is not used in information transmission when Rank 1 is selected in rank adaptation in uplink MIMO transmission. Further, when an antenna gain difference is large between antennas, the flag acts as a flag to designate the presence or absence of a swap of control information of each transport block which is performed to uniform data rates between transport port blocks.

Further, in the UL grant used in the communication control method according to the invention, the MCS/RV field for the first transport block is used to designate the PMI when the first transport block is made non-transmission in transmission using one transport block. Similarly, the MCS/RV field for the second transport block is used to designate the PMI when the second transport block is made non-transmission in transmission using one transport block. In other words, the MCS/RV field for the transport block made non-transmission is reused to designate the PMI, and reductions in bit information in the UL grant are thereby secured.

In addition, a UL grant used in MIMO transmission of two transmission antennas differs from a UL grant used in MIMO transmission of four transmission antennas in the number of bits forming the PMI/RI field. The UL grant used in MIMO transmission of two transmission antennas includes the PMI/RI field of 1 bit.

In the communication control method according to the invention, the base station apparatus eNode B generates such a UL grant, and includes the UL grant in the PDCCH (Physical Downlink Control CHannel) that is a downlink control channel signal to transmit to the mobile station apparatus UE. The mobile station apparatus UE decodes the PDCCH, determines control information of each field included in the UL grant, and corresponding to the control information, performs control for uplink MIMO transmission.

Figure 3:
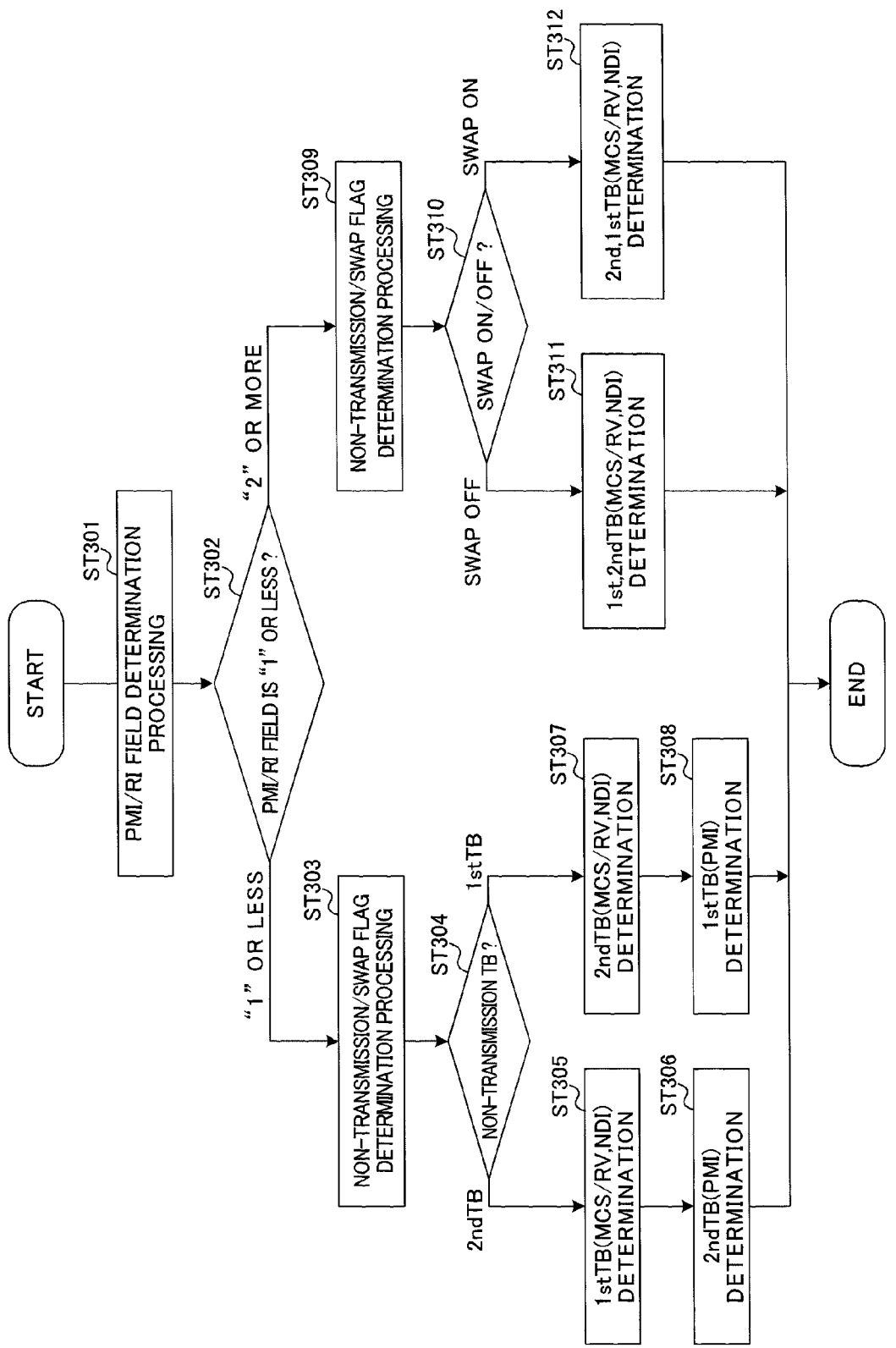
FIG. 3 is a flow diagram to explain processing when a mobile station apparatus acquires control information from the UL grant used in the communication control method according to the invention.

Described below is processing when the mobile station apparatus UE acquires control information from the UL grant used in the communication control method according to the invention. FIG. 3 is a flow diagram to explain the processing when the mobile station apparatus UE acquires control information from the UL grant used in the communication control method according to the invention.

Upon receiving a PDCCH signal from the base station apparatus eNode B, the mobile station apparatus UE decodes the PDCCH signal to acquire a UL grant. Then, the apparatus UE starts determination processing (PMI/RI field determination processing) of a value (bit information) designated in the PMI/RI field on the acquired UL grant (step (hereinafter, referred to as ST) 301).

Herein, the value designated in the PMI/RI field is defined as described below. With respect to the Rank, only in the case where the value of the PMI/RI field is "0" (i.e. the case where the bit information of 5 bits is "00000"), Rank 1 is designated. Further, Rank 2 is designated in the case where the value of the PMI/RI field is in the range of "1" to "17", Rank 3 is designated in the case where the value is in the range of "18" to "29", and Rank 4 is designated in the case where the value is "30".

Meanwhile, with respect to the number of transport blocks to transmit, only in the case where the value of the PMI/RI field is "1" or less (i.e. the case where the bit information of 5 bits is "00000" or "00001"), transmission with one transport block is designated. In this case, transmission with the first transport block is designated in the case where the value of the PMI/RI field is "0", and non-transmission of the first transport block (i.e. transmission with the second transport block) is designated in the case where the value is "1". Further, in the case where the value of the PMI/RI field is "2" or more (i.e. the case where the bit information of 5 bits is "00010" or more), transmission with two transport blocks is designated.

Further, with respect to the PMI, the PMI is designated in the case where the value of the PMI/RI field is "2" or more. In this case, the PMI of from "0" to "15" of Rank 2 is designated in the case where the information of the PMI/RI field is in the range of "2" to "17" (in the case of Rank 2), the PMI of from "0" to "11" of Rank 3 is designated in the case where the information is in the range of "18" to "29" (in the case of Rank 3), and the PMI of "0" of Rank 4 is designated in the case where the information is "30" (in the case of Rank 4). Meanwhile, in the case where the value of the PMI/RI field is "1" or less (i.e. the case of designating transmission with one transport block), the PMI is not designated.

In addition, the case were the value of the PMI/RI field is "31" is prepared for a future use, and anything is not defined at the present time.

When the PMI/RI field determination processing is started in ST 301, it is determined whether the value of the PMI/RI field is "1" or less ("2" or more) (ST 302). Herein, when the value of the PMI/RI field is "1" or less, the mobile station apparatus UE grasps information transmission by one transport block, and shifts to non-transmission/swap flag determination processing (ST 303).

In the non-transmission/swap flag determination processing in ST 303, the non-transmission/swap flag acts as a flag indicative of a transport block made non-transmission. For example, in the case where the value of 1 bit forming the non-transmission/swap flag is "0", it is indicated that the second transport block is non-transmission, and in the case where the value is "1", it is indicated that the first transport block is non-transmission.

In the non-transmission/swap flag determination processing in ST 303, the transport block (TB) made non-transmission is determined by determining the bit information of the non-transmission/swap flag (ST 304). Herein, when it is determined that the second transport block is non-transmission, the information of the MCS/RV field and the NDI field for the first transport block is determined (ST 305), and the MCS information, RV information and NDI information is acquired. In the communication control method according to the invention, when the second transport block is non-transmission, the PMI is designated in the MCS/RV field of the second transport block. Therefore, the PMI designated in MCS/RV field of the second transport block is determined (ST 306), and the PMI information is acquired.

Meanwhile, in ST 304, when it is determined that the first transport block is non-transmission, the information of the MCS/RV field and the NDI field for the second transport block is determined (ST 307), and the MCS information, RV information and NDI information is acquired. In the communication control method according to the invention, when the first transport block is non-transmission, the PMI is designated in the MCS/RV field of the first transport block. Therefore, the PMI designated in MCS/RV field of the first transport block is determined (ST 308), and the PMI information is acquired. Thus, the mobile station apparatus UE acquires the MCS information, RV information, NDI information and PMI/RI information in the case where information transmission is performed with one transport block.

Meanwhile, in ST 302, when the information of the PMI/RI field is "2" or more, the mobile station apparatus UE grasps information transmission by two transport blocks, and shifts to non-transmission/swap flag determination processing (ST 309).

In the non-transmission/swap flag determination processing in ST 303, the non-transmission/swap flag acts as a flag indicative of the presence or absence of a swap of control information between two transport blocks. For example, in the case where the information of 1 bit forming the non-transmission/swap flag is "0", it is indicated that a swap of control information between two transport blocks is not performed (swap off), and in the case where the information is "1", it is indicated that a swap of control information between two transport blocks is performed (swap on).

In the non-transmission/swap flag determination processing in ST 303, the presence or absence of (swap on/off) of a swap of control information between two transport blocks is determined by determining the bit information of the non-transmission/swap flag (ST 310). Herein, when swap off of control information between two transport blocks is determined, the information of the MCS/RV field and the NDI field for the first transport block is determined to acquire the MCS information, RV information and NDI information for the first transport block, and the information of the MCS/RV field and the NDI field for the second transport block is determined to acquire the MCS information, RV information and NDI information for the second transport block (ST 311). In other words, the information of the MCS/RV fields and the NDI fields for respective transport blocks is not swapped, and is acquired as the MCS information, RV information and NDI information for corresponding transport blocks.

Meanwhile, when swap on of control information between two transport blocks is determined, the information of the MCS/RV field and the NDI field for the second transport block is determined to acquire the MCS information, RV information and NDI information for the first transport block, and the information of the MCS/RV field and the NDI field for the first transport block is determined to acquire the MCS information, RV information and NDI information for the second transport block (ST 312). In other words, the information of the MCS/RV fields and the NDI fields for respective transport blocks is swapped, and is acquired as the MCS information, RV information and NDI information for corresponding transport blocks. In this case, the PMI is acquired from the PMI/RI field. Thus, the mobile station apparatus UE acquires the MCS information, RV information, NDI information and PMI/RI information in the case where information transmission is performed with two transport blocks.

In the communication control method according to the invention, as shown in FIG. 3, the non-transmission/swap flag is provided with two roles (the role as a flag to designate a transport block made non-transmission, and the role as a flag to designate the presence or absence of a swap of control information between two transport blocks) corresponding to a value designated in the PMI/RI field. By this means, it is possible to notify a transport block made non-transmission, and the presence or absence of a swap of control information between two transport blocks by 1 bit, corresponding to a value designated in the PMI/RI field, and it is thereby possible to notify the control information needed in actualizing the processing for making one of transport blocks non-transmission by rank adaptation, and the processing for swapping control information to uniform data rates between transport blocks in uplink MIMO transmission, while reducing overhead.

Particularly, in the communication control method according to the invention, a transport block made non-transmission is determined corresponding to the value of the non-transmission/swap flag in the case where the value of the PMI/RI field is a predetermined value or less. More specifically, as shown in FIG. 3, when four transmission antennas are used, a transport block made non-transmission is determined in the case where the value of the PMI/RI field is "1" or less. By this means, it is possible to clarify the case where the non-transmission/swap flag functions as a flag indicative of the transport block made non-transmission, and it is possible to simplify the determination processing in the mobile station apparatus UE.

Similarly, in the communication control method according to the invention, the presence or absence of a swap of control information between two transport blocks is determined corresponding to the value of the non-transmission/swap flag in the case where the value of the PMI/RI field is a predetermined value or more. More specifically, as shown in FIG. 3, when four transmission antennas are used, the presence or absence of a swap of control information between two transport blocks is determined in the case where the value of the PMI/RI field is "2" or more. By this means, it is possible to clarify the case where the non-transmission/swap flag functions as a flag indicative of the presence or absence of a swap of control information between two transport blocks, and it is possible to simplify the determination processing in the mobile station apparatus UE.

In addition, FIG. 3 shows the processing associated with the UL grant used in MIMO transmission of four transmission antennas. In the processing associated with the UL grant used in MIMO transmission of two transmission antennas, the processing in ST 302 differs the processing associated with the UL grant used in MIMO transmission of four transmission antennas. In other words, in the processing associated with the UL grant used in MIMO transmission of two transmission antennas, in ST 302 it is determined whether the information of the PMI/RI field is "0" ("1"). The processing flow shifts to ST 303 when the information of the PMI/RI field is "0", while shifting to ST 309 when the information of the PMI/RI field is "1".

In other words, when two transmission antennas are used, a transport block made non-transmission is determined corresponding to the value of the non-transmission/swap flag in the case where the value of the PMI/RI field is "0". Meanwhile, the presence or absence of a swap of control information between two transport blocks is determined corresponding to the value of the non-transmission/swap flag in the case where the value of the PMI/RI field is "1". By this means, it is possible to clarify the case where the non-transmission/swap flag functions as a flag indicative of the transport block made non-transmission, and the case where the non-transmission/swap flag functions as a flag indicative of the presence or absence of a swap of control information between two transport blocks, and it is possible to simplify the determination processing in the mobile station apparatus UE.

Further, in the communication control method according to the invention, when information transmission is performed with one transport block, the UL grant is generated to designate the PMI information in the MCS/RV field for the transport block made non-transmission, and the mobile station apparatus UE acquires the PMI information from the MCS/RV field for the transport block made non-transmission. Thus, reused is the MCS/RV field for the transport block which is made non-transmission and is not used for designation of control information, it is thereby possible to decrease the bit information in the UL grant, and it is possible to reduce overhead.

Figure 4:
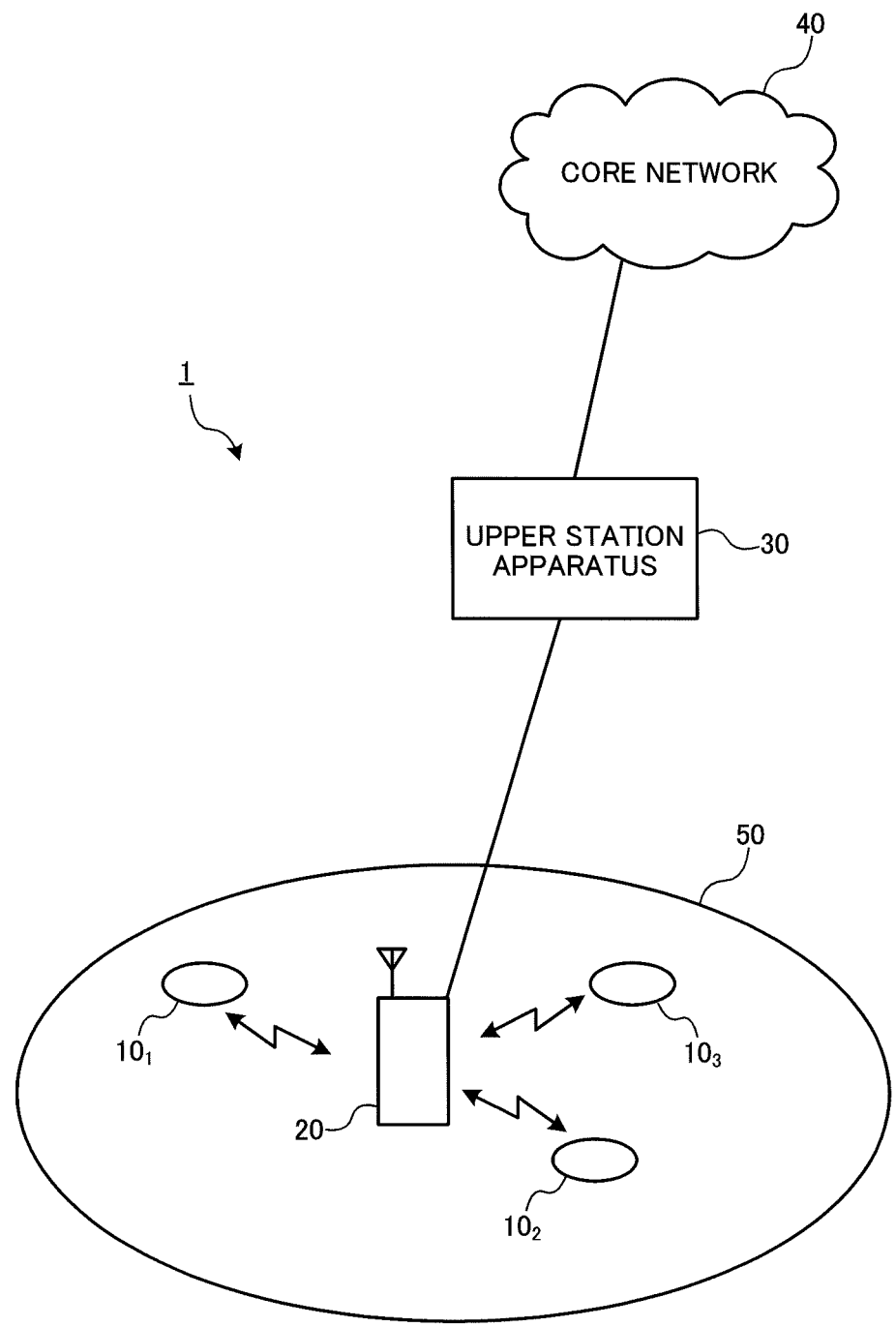
FIG. 4 is a network configuration diagram to which is applied the communication control method according to one Embodiment of the invention.

Described below is a configuration of a mobile communication system to which is applied the communication control method according to one Embodiment of the invention. FIG. 4 is a network configuration diagram of the mobile communication system to which is applied the communication control method according to one Embodiment of the invention.

A mobile communication system 1 is a system to which is applied LTE (Long Term Evolution)-Advanced, for example. The mobile communication system 1 is provided with a base station apparatus 20 and a plurality of mobile station apparatuses 10 ($10_1$, $10_2$, $10_3$, ... $10_n$, n is an integer where n>0) that communicate with the base station apparatus 20. The base station apparatus 20 is connected to an upper station, e.g. access gateway apparatus 30, and the access gateway apparatus 30 is connected to a core network 40. The mobile station apparatus 10n communicates with the base station apparatus 20 in a cell 50 by Evolved UTRA and UTRAN. In addition, the access gateway apparatus 30 may be called the MME/SGW (Mobility Management Entity/Serving Gateway).

Each of the mobile station apparatuses ($10_1$, $10_2$, $10_3$, ... $10_n$) has the same configuration, function and state, and is described as a mobile station apparatus 10 unless otherwise specified in the following description. Further, for convenience in description, the description is given while assuming that equipment which performs radio communications with the base station apparatus 20 is the mobile station apparatus 10, and more generally, the equipment may be user equipment (UE) including mobile terminals and fixed terminals.

In the mobile communication system 1, as a radio access scheme, OFDMA (Orthogonal Frequency Division Multiple Access) is applied in downlink, while radio access based on SC-FDMA (Single-Carrier Frequency Division Multiple Access) is applied in uplink. OFDMA is a multicarrier transmission scheme for dividing a frequency band into a plurality of narrow frequency bands (subcarriers), and mapping data to each subcarrier to perform communications. SC-FDMA is a single-carrier transmission scheme for dividing the system band into bands comprised of a single or consecutive resource blocks for each terminal so that a plurality of terminals uses mutually different bands, and thereby reducing interference among the terminals.

Described herein are communication channels in Evolved UTRA and UTRAN. In downlink, used are the Physical Downlink Shared Channel (PDSCH: Physical Downlink Shared CHannel) shared among the mobile station apparatuses 10, and the Physical Downlink Control Channel (PD- CCH: Physical Downlink Control CHannel, also called the downlink L1/L2 control channel) that is a control channel in downlink. User data i.e. normal data signals are transmitted on the aforementioned Physical Downlink Shared Channel. Further, as feedback, on the Physical Downlink Control Channel are transmitted precoding information for uplink MIMO transmission, ID of a user that performs communications using the Physical Downlink Shared Channel, information (i.e. Downlink Scheduling Information) of transport format of the user data, ID of a user that performs communications using the Physical Uplink Shared Channel, information (i.e. Uplink Scheduling Grant) of transport format of the user data, and the like.

Further, in downlink, broadcast channels such as the P-BCH (Physical-Broadcast Channel) and D-BCH (Dynamic Broadcast Channel) are transmitted. Information transmitted on the P-BCH is MIB (Master Information Block), and information transmitted on the D-BCH is SIB (System Information Block). The D-BCH is mapped to the PDSCH, and is transmitted from the base station apparatus 20 to the mobile station apparatus 10n.

In uplink, used are the Physical Uplink Shared Channel (PUSCH: Physical Uplink Shared CHannel) shared among the mobile station apparatuses 10, and the Physical Uplink Control Channel (PUCCH: Physical Uplink Control CHannel) that is a control channel in uplink. User data i.e. normal data signals are transmitted on the Physical Uplink Shared Channel. Meanwhile, on the Physical Uplink Control Channel are transmitted precoding information for downlink MIMO transmission, acknowledgement/negative acknowledgment in response to the downlink shared channel, downlink radio quality information (CQI: Channel Quality Indicator), etc.

Further, in uplink, the Physical Random Access Channel (PRACH: Physical Random Access CHannel) is defined for initial connection and the like. The mobile station apparatus 10 transmits a random access preamble to the base station apparatus 20 on the PRACH.

Figure 5:
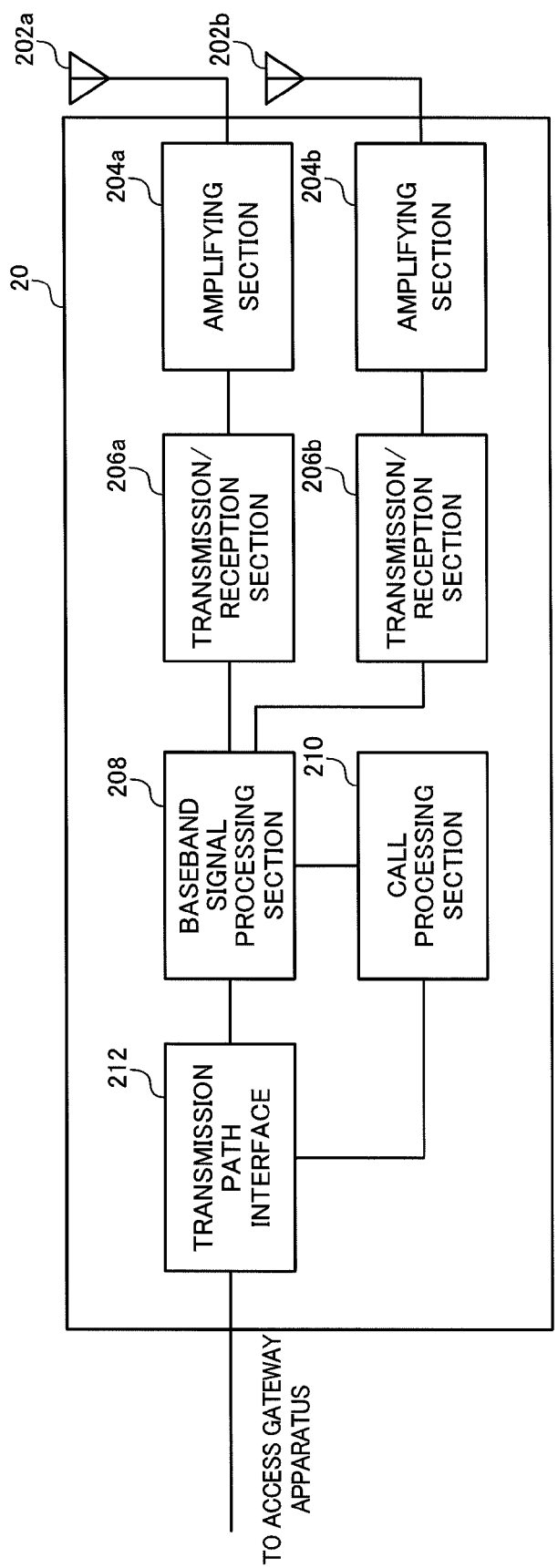
FIG. 5 is a block diagram illustrating a configuration of a base station apparatus according to the Embodiment.

Referring to FIG. 5, described next is a configuration of the base station apparatus 20 according to this Embodiment. As shown in FIG. 5, the base station apparatus 20 according to this Embodiment is provided with two transmission/reception antennas 202a, 202b for MIMO transmission, amplifying sections 204a, 204b, transmission/reception sections 206a, 206b, baseband signal processing section 208, call processing section 210 and transmission path interface 212. In addition, the transmission/reception sections 206a, 206b constitute a part of the transmission section in the invention.

The user data to transmit from the base station apparatus 20 to the mobile station apparatus 10 in downlink is input to the baseband signal processing section 208 via the transmission path interface 212 from the upper station apparatus positioned higher than the base station apparatus 20, for example, the access gateway apparatus 30.

The baseband signal processing section 208 performs, on the data, PDCP layer processing, segmentation and concatenation of the user data, RLC (Radio Link Control) layer transmission processing such as transmission processing of RLC retransmission control, MAC (Medium Access Control) retransmission control e.g. HARQ (Hybrid Automatic Repeat reQuest) transmission processing, scheduling, transmission format selection, channel coding, Inverse Fast Fourier Transform (IFFT) processing and precoding processing, and transfers the signal to the transmission/reception sections 206a, 206b. Further, on signals of the Physical Downlink Control Channel, the section 208 also performs transmission processing of channel coding, Inverse Fast Fourier Transform and the like to transfer to the transmission/reception sections 206a, 206b.

Further, the baseband signal processing section 208 transmits control information for communications in the cell to the mobile station apparatus 10 as feedback on the above-mentioned broadcast channel. For example, the control information for communications in the cell includes the system bandwidth in uplink or downlink, information of resource blocks assigned to the mobile station apparatus 10, identification information (Root Sequence Index) of a root sequence to generate a signal of a random access preamble on the PRACH, etc.

The transmission/reception sections 206a, 206b perform frequency conversion processing for converting the frequency of the baseband signal, which is precoded for each antenna and output from the baseband signal processing section 208, into a radio frequency band, and then, the signals are amplified in the amplifying sections 204a, 204b, and transmitted from the transmission/reception antennas 202a, 202b, respectively.

Meanwhile, with respect to the data to transmit from the mobile station apparatus 10 to the base station apparatus 20 in uplink, radio frequency signals received in the transmission/reception antennas 202a, 202b are amplified in the amplifying sections 204a, 204b, subjected to frequency conversion in the transmission/reception sections 206a, 206b, thereby converted into baseband signals, and are input to the baseband signal processing section 208.

The baseband signal processing section 208 performs FFT processing, IDFT processing, error correcting decoding, reception processing of MAC retransmission control, and reception processing of RLC layer and PDCP layer on the user data included in the input baseband signals, and transfers the data to the access gateway apparatus 30 via the transmission path interface 212.

The call processing section 210 performs call processing such as setting and release of the communication channel, status management of the base station apparatus 20, and management of radio resources.

Figure 6:
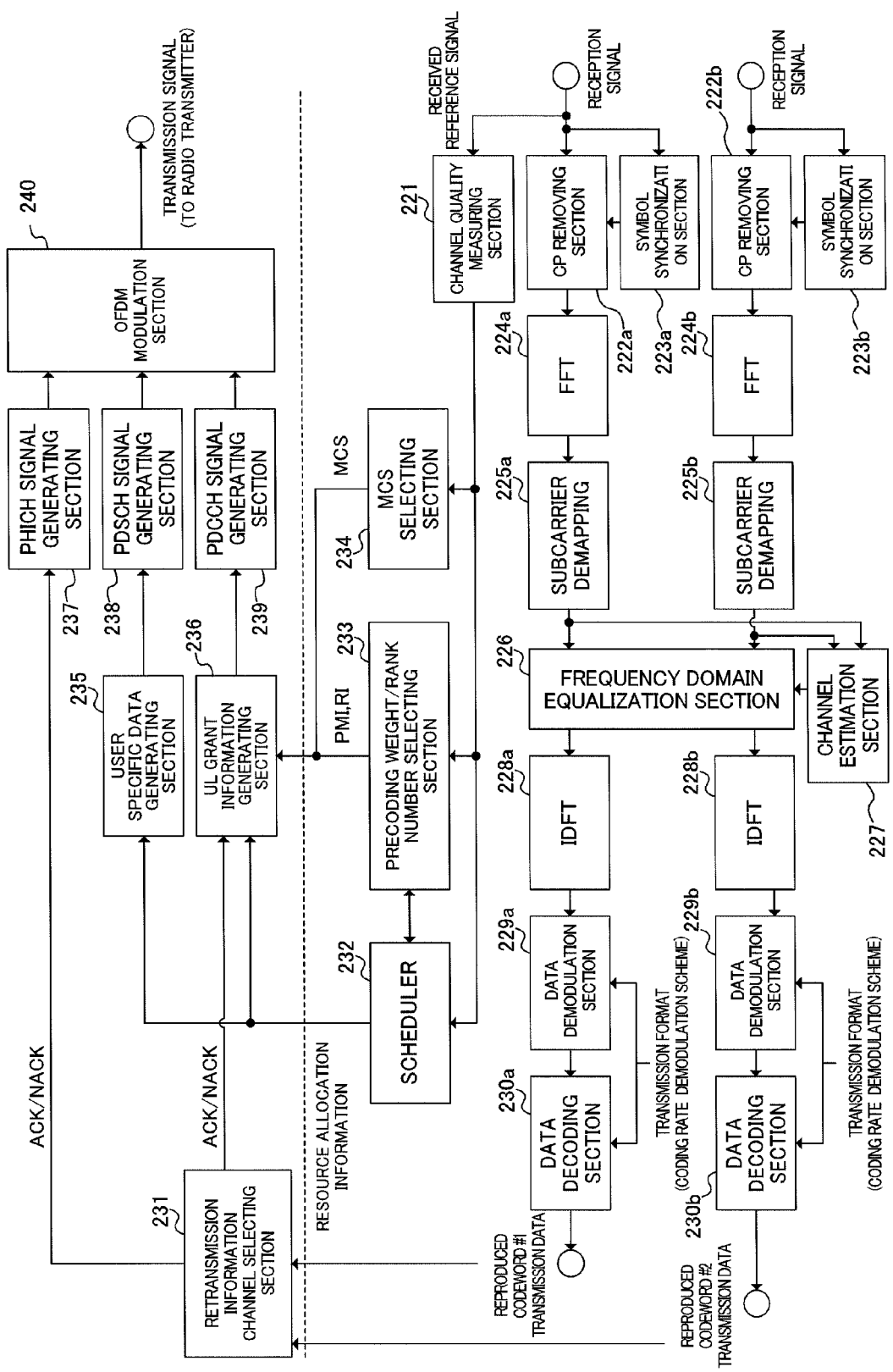
FIG. 6 is a functional block diagram of a baseband signal processing section of the base station apparatus according to the Embodiment.

Referring to FIG. 6, described herein is a configuration of the baseband signal processing section 208 in the base station apparatus 20 according to this Embodiment. FIG. 6 is a functional block diagram of the baseband signal processing section 208 in the base station apparatus 20 according to this Embodiment. In addition, for convenience in description, FIG. 6 includes a configuration of a scheduler 232 and the like.

A reference signal (channel quality reference signal) included in a reception signal is input to a channel quality measuring section 221. The channel quality measuring section 221 measures channel quality information (CQI) in uplink, based on a reception state of the reference signal received from the mobile station apparatus 10. Meanwhile, in reception signals input to the baseband signal processing section 208, cyclic prefixes added to the reception signals are removed in CP (Cyclic Prefix) removing sections 222a, 222b, and then, the signals are subjected to Fourier transform in the fast Fourier transform sections 224a, 224b, and are transformed into information in the frequency domain, respectively. In addition, symbol synchronization sections 223a, 223b estimate synchronization timing from reference signals included in the reception signals, and notify the CP removing sections 222a, 222b of the estimation results, respectively.

The reception signals transformed into the information in the frequency domain are demapped in the frequency domain in subcarrier demapping sections 225a, 225b. The subcarrier demapping sections 225a, 225b demap in response to mapping in the mobile station apparatus 10. A frequency domain equalization section 226 equalizes the reception signals based on channel estimation values provided from a channel estimation section 227. The channel estimation section estimates channel states from the reference signals included in the reception signals.

Inverse Discrete Fourier Transform (IDFT) sections 228a, 228b perform inverse discrete Fourier transform on the reception signals, and restore the signals in the frequency domain into the signals in the time domain. Data demodulation sections 229a, 229b and data decoding sections 230a, 230b reproduce transmission data based on transmission formats (coding rate, modulation scheme), respectively. By this means, reproduced is transmission data of codeword #1 associated with the first transport block and transmission data of codeword #2 associated with the second transport block.

The reproduced transmission data of codewords #1 and #2 is output to a retransmission information channel selecting section 231. The retransmission information channel selecting section 231 determines the necessity of retransmission (ACK/NACK) in the transmission data of codewords #1 and #2. Then, based on the necessity of retransmission in the transmission data of codewords #1 and #2, the section 231 generates retransmission related information such as NDI information and RV information. Further, the retransmission information channel selecting section 231 selects a channel (PHICH or PDCCH (UL grant)) to transmit the retransmission information.

The scheduler 232 determines resource allocation information in uplink and downlink, based on the channel quality information (CQI) provided from the channel quality measuring section 221, and PMI information and RI information provided from a precoding weight/rank number selecting section 233, described later.

The precoding weight/rank number selecting section 233 determines precoding weights (PMI) for a mobile station apparatus 10 to control the phase and/or amplitude of a transmission signal for each antenna, from the reception quality in uplink in a resource block assigned to the mobile station apparatus 10, based on the channel equality information (CQI) provided from the channel quality measuring section 221. Further, the precoding weight/rank number selecting section 233 determines the rank number (RI) indicative of the number of layers of spatial multiplexing in uplink, based on the channel equality information (CQI) provided from the channel quality measuring section 221.

An MCS selecting section 234 selects modulation scheme and channel coding rate (MCS) based on the channel equality information (CQI) provided from the channel quality measuring section 221.

An user specific data generating section 235 generates individual downlink transmission data (individual user data) for each mobile station apparatus 10 from the user data input from the upper station apparatus such as the access gateway apparatus 30, according to the resource allocation information provided from the scheduler 232.

A UL grant information generating section 236 generates a DCI format including the above-mentioned UL grant, based on the ACK/NAC information and retransmission related information (NDI information, RV information) provided from the retransmission information channel selecting section 231, the resource allocation information provided from the scheduler 232, the PMI and RI information provided from the precoding weight/rank number selecting section 233, and the MCS information provided from the MCS selecting section 234. In addition, the UL grant information generating section 236 is to constitute the generation section in the invention.

For example, in the case that information transmission is performed with one transport block in Rank 1 and that the information transmission is performed with only the first transport block, "0" is designated as information of the PMI/RI field, and the MCS information, the RV information and the NDI information is respectively designated in the MCS/RV field and NDI field for the first transport block. Further, the bit information indicating that the second transport block is non-transmission is designated in the flag field, and the PMI information is designated in the MCS/RV field for the second transport block.

Meanwhile, in the case that information transmission is performed with two transport blocks in Rank 2, for example, "2" is designated as information of the PMI/RI field, and the MCS information, the RV information and the NDI information is respectively designated in the MCS/RV fields and NDI fields for the first and second transport blocks. Further, the bit information indicative of the presence or absence of a swap of the control information for transport blocks is designated in the flag field.

A PHICH signal generating section 237 generates a PCHICH signal including an acknowledgment response of Hybrid ARQ to indicate whether or not to retransmit the transport block to the mobile station apparatus 10, based on the ACK/NACK information and retransmission related information (NDI information, RV information) provided from the retransmission information channel selecting section 231.

A PDSCH signal generating section 238 generates downlink transmission data to actually transmit on the Physical Downlink Shared Channel (PDSCH), based on the downlink transmission data (individual user data) generated in the user specific data generating section 235. A PDCCH signal generating section 239 generates a PDCCH signal to multiplex into the Physical Downlink Control Channel, based on the DCI format including the UL grant generated in the UL grant information generating section 236.

An OFDM modulation section 240 receives the PHICH signal, PDSCH signal and PDCCH signal respectively generated in the PHICH signal generating section 237, PDSCH signal generating section 238, and PDCCH signal generating section 239. The OFDM modulation section 240 performs OFDM modulation processing on signals of two sequences including the PHICH signal, PDSCH signal and PDCCH signal to output to the transmission/reception sections 206a, 206b.

Thus, the base station apparatus 20 generates a UL grant having the PMI/RI field and non-transmission/swap flag field of 1 bit indicative of a transport block made non-transmission and the presence or absence of a swap of control information between two transport blocks, corresponding to a value of the PMI/RI field, and transmits a downlink control channel signal including the UL grant to the mobile station apparatus 10. By this means, it is possible to notify, by 1 bit, the transport block made non-transmission and the presence or absence of a swap of control information between two transport blocks, corresponding to a value of the PMI/RI field. Therefore, it is possible to notify the control information needed in actualizing the processing for making one of transport blocks non-transmission by rank adaptation, and the processing for swapping control information to uniform data rates between transport blocks in uplink MIMO transmission, while reducing overhead.

Figure 7:
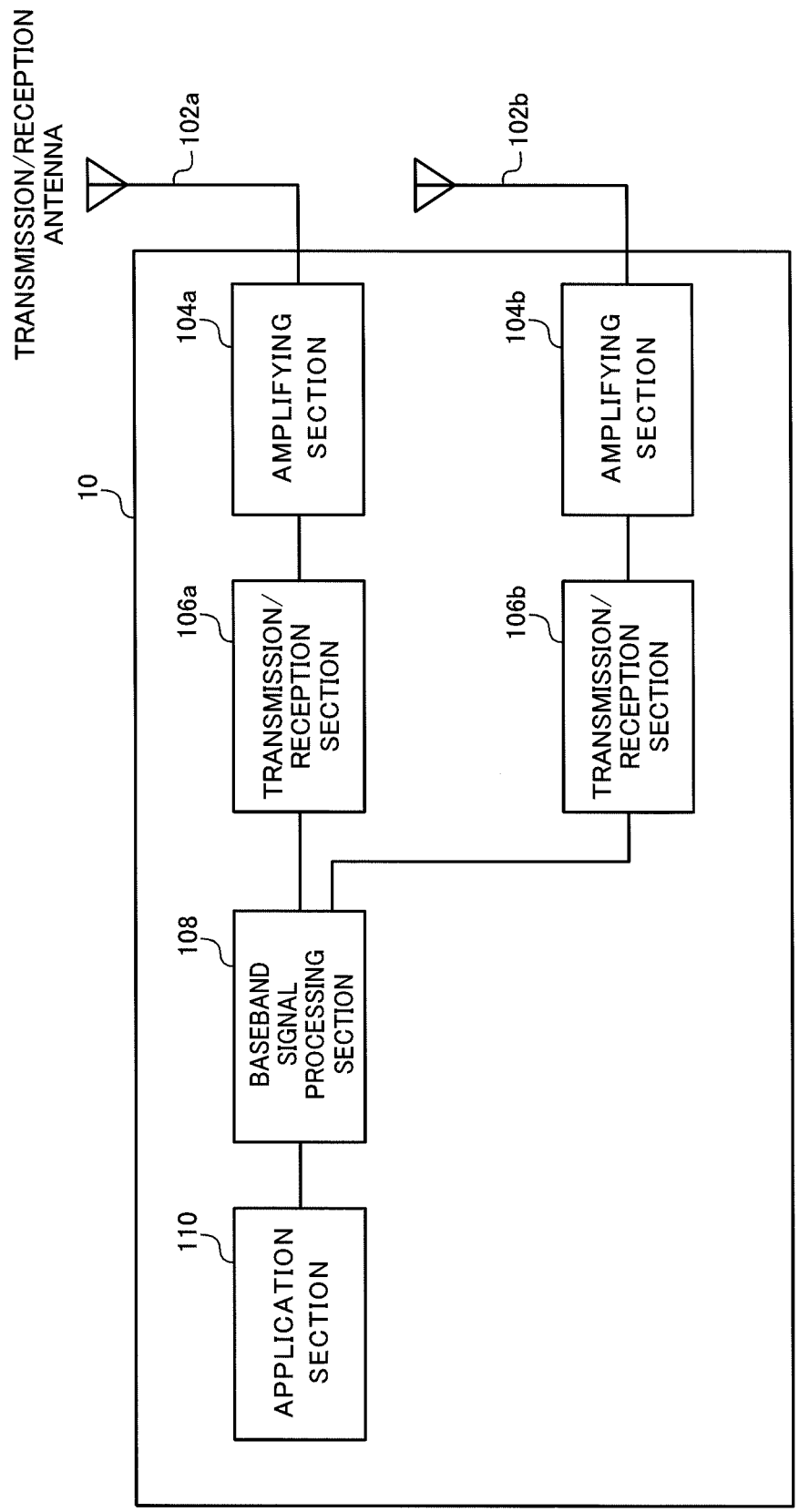
FIG. 7 is a block diagram illustrating a configuration of a mobile station apparatus according to the Embodiment.

Referring to FIG. 7, described next is a configuration of the mobile station apparatus 10 according to this Embodiment. As shown in FIG. 7, the mobile station apparatus 10 according to this Embodiment is provided with two transmission/reception antennas 102a, 102b for MIMO transmission, amplifying sections 104a, 104b, transmission/reception sections 106a, 106b, baseband signal processing section 108 and application section 110. In addition, the transmission/reception sections 106a, 106b constitute apart of the reception means in the invention.

With respect to the data in downlink, radio frequency signals received in two transmission/reception antennas 102a, 102b are amplified in the amplifying sections 104a, 104b, subjected to frequency conversion in the transmission/reception sections 106a, 106b, and are converted into baseband signals, respectively. The baseband signals are subjected to FFT processing, error correcting decoding, reception processing of retransmission control, etc. in the baseband signal processing section 108. Among such data in downlink, the user data in downlink is transferred to the application section 110. The application section 110 performs processing concerning layers higher than the physical layer and MAC layer and the like. Further, among the data in downlink, the broadcast information is also transferred to the application section 110.

Meanwhile, with respect to the user data in uplink, the application section 110 inputs the data to the baseband signal processing section 108. The baseband signal processing section 108 performs transmission processing of retransmission control (H-ARQ: Hybrid ARQ), channel coding, precoding, DFT processing, IFFT processing, etc. on the data, and transfers the signals to the transmission/reception sections 106a, 106b. The transmission/reception sections 106a, 106b perform frequency conversion processing for converting the frequency of the baseband signal output from the baseband signal processing section 108 into a radio frequency band, and then, the signals are amplified in the amplifying sections 104a, 104b, and transmitted from the transmission/reception antennas 102a, 102b, respectively.

Figure 8:
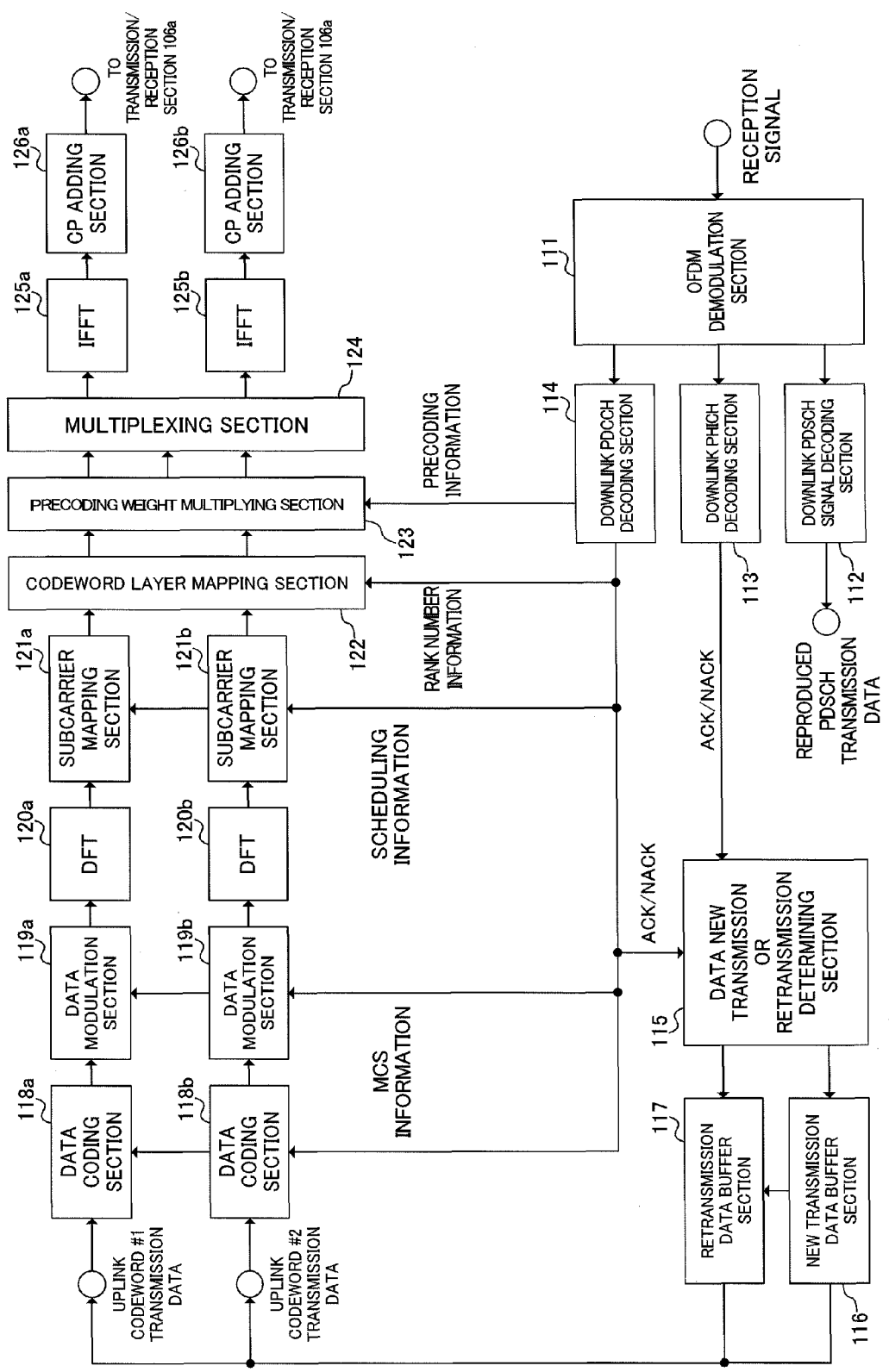
FIG. 8 is a functional block diagram of a baseband signal processing section of the mobile station apparatus according to the Embodiment.

Referring to FIG. 8, described herein is a configuration of the baseband signal processing section 108 in the mobile station apparatus 10 according to this Embodiment. FIG. 8 is a functional block diagram of the baseband signal processing section 108 in the mobile station apparatus 10 according to this Embodiment.

An OFDM demodulation section 111 demodulates reception signals output from the transmission/reception sections 106a, 106b. Among the reception signals in downlink demodulated in the OFDM demodulation section 111, a PDSCH signal is input to a downlink PDSCH signal decoding section 112, a PHICH signal is input to a downlink PHICH decoding section 113, and a PDCCH signal is input to a downlink PDCCH decoding section 114. The downlink PDSCH signal decoding section 112 decodes the PDSCH signal, and reproduces the PDSCH transmission data. The downlink PHICH decoding section 113 decodes the downlink PHICH signal. The downlink PDCCH decoding section 114 decodes the PDCCH signal. The PDCCH signal includes a DCI format including the UL grant used in the communication control method according to the invention. In addition, the downlink PDCCH decoding section 114 constitutes the decoding section in the invention.

The downlink PDCCH decoding section 114 acquires the control information designated in the UL grant according to the processing as shown in FIG. 3. For example, in the case that information transmission is performed with one transport block in Rank 1 and that the information transmission is performed with only the first transport block, the section 114 acquires the rank information (Rank 1) from "0" designated as information of the PMI/RI field. Further, the section 114 acquires the MCS information, the RV information and the NDI information from the MCS/RV field and NDI field for the first transport block. Furthermore, the section 114 acquires the information indicating that the second transport block is non-transmission from the information designated in the flag field (non-transmission/swap flag). Still furthermore, the section 114 acquires the PMI information from the MCS/RV field for the second transport block.

Meanwhile, in the case that information transmission is performed with two transport blocks in Rank 2, for example, the section 114 acquires the rank information (Rank 2) from "2" designated as information of the PMI/RI field. Further, the section 114 acquires the MCS information, the RV information and the NDI information from the MCS/RV fields and NDI fields for the first and second transport blocks. Furthermore, the section 114 acquires information indicative of the presence or absence of a swap of the control information for transport blocks from information designated in the flag field (non-transmission/swap flag).

When the PHICH signal decoded in the downlink PHICH decoding section 113 includes an acknowledgment response (ACK/NACK) of HybridARQ, a data new transmission/retransmission determining section 115 determines new data transmission or retransmission based on the acknowledgment response (ACK/NACK) of Hybrid ARQ. Further, when the UL grant of the PDCCH signal includes an acknowledgment response (ACK/NACK) of Hybrid ARQ, the section 115 determines new data transmission or retransmission based on the acknowledgment response (ACK/NACK) of Hybrid ARQ. The section 115 notifies these determination results to a new transmission data buffer section 116 and retransmission data buffer section 117.

The new transmission data buffer section 116 buffers the transmission data in uplink input from the application section 110. The retransmission data buffer section 117 buffers the transmission data output from the new transmission data buffer section 116. When the determination result indicative of new data transmission is notified from the data new transmission/retransmission determining section 115, uplink transmission data is generated from the transmission data in the new transmission data buffer section 116. Meanwhile, when the determination result indicative of data retransmission is notified from the data new transmission/retransmission determining section 115, uplink transmission data is generated from the transmission data in the retransmission data buffer section 117.

The generated uplink transmission data is input to a serial/parallel transform section, not shown. The serial/parallel transform section performs serial/parallel transform on the uplink transmission data to be signals corresponding to the number of codewords according to the rank number in uplink. In addition, the codeword indicates a coding unit of channel coding, and the number (the number of codewords) is uniquely determined according to the rank number and/or the number of transmission antennas. Shown herein is the case that the number of codewords is determined to be "2". In addition, the number of codewords and the number of layers (rank number) are not always equal to each other. Uplink codeword #1 transmission data and uplink codeword #2 transmission data is input to data coding sections 118a, 118b, respectively.

The data coding section 118a codes the uplink codeword #1 transmission data. The uplink codeword #1 transmission data coded in the data coding section 118a is modulated in a data modulation section 119a, and is subjected to inverse Fourier transform in an inverse Fourier transform section (DFT) 120a, and the time-series information is transformed into the information in the frequency domain. In addition, the data coding section 118a and data modulation section 119a respectively performs coding and modulation processing on the uplink codeword #1 transmission data, based on the MCS information from the downlink PDCCH decoding section 114. A subcarrier mapping section 121a performs mapping in the frequency domain, based on scheduling information (resource allocation information) from the downlink PDCCH decoding section 114. Then, the mapped uplink codeword #1 transmission data is input to a codeword layer mapping section 112.

In addition, the data coding section 118b, data modulation section 119b, inverse Fourier transform section 120b, and subcarrier mapping section 121b also perform the same processing on the uplink codeword #2 transmission data, and the mapped uplink codeword #2 transmission data is input to the codeword layer mapping section 112.

The codeword layer mapping section 122 distributes the uplink codeword #1 and #2 transmission data input from the subcarrier mapping sections 121a, 121b corresponding to the number of layers, according to the uplink rank number information from the downlink PDCCH decoding section 114. Then, the distributed uplink codeword #1 and #2 transmission data is input to a precoding weight multiplying section 123.

The precoding weight multiplying section 123 shifts the phase and/or amplitude (weighting of transmission antennas by precoding) of the transmission signal for each of the transmission/reception antennas 102a, 102b, based on uplink precoding information from the downlink PDCCH decoding section 114. By this means, it is possible to increase reception power of reception signals in the base station apparatus 20, and to improve throughput characteristics. After precoding, through multiplexing processing in a multiplexing section 124, inverse fast Fourier transform sections (IFFT) 125a, 125b perform inverse fast Fourier transform on the transmission signals, and transform the signals in the frequency domain into signals in the time domain. Then, Cyclic Prefix (CP) adding sections 126a, 126b add cyclic prefixes to the transmission signals. Herein, the cyclic prefix functions as a guard interval to absorb multipath propagation delays and differences in transmission timing among a plurality of users in the base station apparatus 20. The transmission signals provided with the cyclic prefixes are output to the transmission/reception sections 106a, 106.

Thus, the mobile station apparatus 10 receives a PDCCH signal including the UL grant having the PMI/RI field, and the non-transmission/swap flag field of 1 bit indicative of a transport block made non-transmission and the presence or absence of a swap of control information between two transport blocks, corresponding to a value of the PMI/RI field, and determines the transport block made non-transmission and the presence or absence of a swap of control information between two transport blocks from the non-transmission/swap flag of the UL grant. By this means, it is possible to notify the control information needed in actualizing the processing for making one of transport blocks non-transmission by rank adaptation, and the processing for swapping control information to uniform data rates between transport blocks in uplink MIMO transmission, while reducing overhead.

Thus, according to the communication control method according to this Embodiment, 1 bit is used to notify a transport block made non-transmission and the presence or absence of a swap of control information between two transport blocks, corresponding to a value of the PMI/RI field.

Therefore, it is possible to notify the control information needed in actualizing the processing for making one of transport blocks non-transmission by rank adaptation, and the processing for swapping control information to uniform data rates between transport blocks in uplink MIMO transmission, while reducing overhead.

In the above-mentioned descriptions, the present invention is specifically described using the above-mentioned Embodiment, but it is obvious to a person skilled in the art that the invention is not limited to the Embodiment described in the Description. The invention is capable of being carried into practice as modified and changed aspects without departing from the subject matter and scope of the invention defined by the descriptions of the scope of the claims. Accordingly, the descriptions of the Description are intended for illustrative explanation, and do not have any restrictive meaning to the invention.

For example, the above-mentioned Embodiment describes the communication control method according to the invention, focusing on the configurations of the UL grant in the case that uplink MIMO transmission is performed using four transmission antennas (two transmission antennas). However, uplink MIMO transmission to apply the communication control method according to the invention is not limited to the cases of performing with the transmission antennas, and is capable of being modified as appropriate. For example, the invention is capable of being applied to uplink MIMO transmission performed using eight transmission antennas.

The present application is based on Japanese Patent Application No. 2010-181908 filed on Aug. 16, 2010, entire content of which is expressly incorporated by reference herein.

The invention claimed is:

1. A communication control method comprising:
generating a UL grant having a field for PMI (Precoding Matrix Indicator)/RI (Rank Indicator) information, and another field for a non-transmission/swap flag of 1 bit indicative of a transport block made non-transmission and the presence or absence of a swap of control information between two transport blocks, corresponding to a value of the field for PMI/RI information;
transmitting a downlink control channel signal including the UL grant to a mobile station apparatus; and
determining the transport block made non-transmission and the presence or absence of a swap of control information between two transport blocks from the non-transmission/swap flag of the UL grant, wherein,
when the value of the field for PMI/RI information is a predetermined value or less, the transport block made non-transmission is determined corresponding to the value of the non-transmission/swap flag, and
when the value of the field for PMI/RI information is more than the predetermined value, the presence or absence of a swap of control information between two transport blocks is determined corresponding to the value of the non-transmission/swap flag.

2. The communication control method according to claim 1, wherein in a case of uplink MIMO (Multi Input Multi Output) transmission using four transmission antennas or more, the UL grant including the field for PMI/RI information of 5 bits is generated, and when the value of the field for PMI/RI information is "1" or less, the transport block made non-transmission is determined corresponding to the value of the non-transmission/swap flag.

3. The communication control method according to claim 1, wherein in a case of uplink MIMO transmission using two transmission antennas, the UL grant including the field for PMI/RI information of 1 bit is generated, and when the value of the field for PMI/RI information is "0", the transport block made non-transmission is determined corresponding to the value of the non-transmission/swap flag.

4. The communication control method according to claim 1, wherein the UL grant is generated with PMI information designated in an MCS (Modulation and Coding Scheme) field for the transport block made non-transmission, and the mobile station apparatus acquires the PMI information from the MCS (Modulation and Coding Scheme) field for the transport block made non-transmission.

5. The communication control method according to claim 1, wherein in a case of uplink MIMO transmission using four transmission antennas or more, the UL grant including the field for PMI/RI information of 5 bits is generated, and when the value of the field or PMI/RI information is "2" or more, the presence or absence of a swap of control information between two transport blocks is determined corresponding to the value of the non-transmission/swap flag.

6. The communication control method according to claim 1, wherein in a case of uplink MIMO transmission using two transmission antennas, the UL grant including the field for PMI/RI information of 1 bit is generated, and when the value of the field for PMI/RI information is "1", the presence or absence of a swap of control information between two transport blocks is determined corresponding to the value of the non-transmission/swap flag.

7. A base station apparatus comprising:
a generation section configured to generate a UL grant having a field for PMI/RI information, and another field for a non-transmission/swap flag of 1 bit indicative of a transport block made non-transmission and the presence or absence of a swap of control information between two transport blocks, corresponding to a value of the field for PMI/RI information; and
a transmission section configured to transmit a downlink control channel signal including the UL grant to a mobile station apparatus, wherein,
when the value of the field for PMI/RI information is a predetermined value or less, the transport block made non-transmission is determined corresponding to the value of the non-transmission/swap flag, and
when the value of the field for PMI/RI information is more than the predetermined value, the presence or absence of a swap of control information between two transport blocks is determined corresponding to the value of the non-transmission/swap flag.

8. The base station apparatus according to claim 7, wherein the generation section generates the UL grant with PMI information designated in an MCS field for the transport block made non-transmission.

9. A mobile station apparatus comprising:
a reception section configured to receive a downlink control channel signal including a UL grant having a field for PMI/RI information, and another field for a non-transmission/swap flag of 1 bit indicative of a transport block made non-transmission and the presence or absence of a swap of control information between two transport blocks, corresponding to a value of the field for PMI/RI information; and
a decoding section configured to decode the downlink control channel signal and determines the transport block made non-transmission and the presence or absence of a swap of control information between two transport blocks from the non-transmission/swap flag of the UL grant, wherein,
when the value of the field for PMI/RI information is a predetermined value or less, the transport block made non-transmission is determined corresponding to the value of the non-transmissions/swap flag, and
when the value of the field for PMI/RI information is more than the predetermined value, the presence or absence of a swap of control information between two transport blocks is determined corresponding to the value of the non-transmission/swap flag.

10. The mobile station apparatus according to claim 9, wherein the reception section receives the UL grant with PMI information designated in an MCS field for the transport block made non-transmission, and the decoding section acquires the PMI information from the MCS field for the transport block made non-transmission.

* * * * *